United States Patent [19]
Suzuki et al.

[11] Patent Number: 5,993,068
[45] Date of Patent: Nov. 30, 1999

[54] ROLLING BEARING WITH A SHIELD PLATE

[75] Inventors: Hironori Suzuki, Fujisawa; Mamoru Aoki, Yokohama, both of Japan

[73] Assignee: NSK Ltd., Tokyo, Japan

[21] Appl. No.: 09/134,673

[22] Filed: Aug. 14, 1998

[30] Foreign Application Priority Data

Aug. 15, 1997 [JP] Japan .................................. 9-233259

[51] Int. Cl.$^6$ ...................................................... F16C 33/78
[52] U.S. Cl. ............................................ 384/450; 384/488
[58] Field of Search ................................... 384/450, 488, 384/484, 485, 486

[56] References Cited

U.S. PATENT DOCUMENTS 4,978,235  12/1990  Jacob ...................................... 384/450
5,441,351  8/1995  Grunze ...................................... 384/450

*Primary Examiner*—Lenard A. Footland
*Attorney, Agent, or Firm*—Vorys, Sater, Seymour and Pease LLP

[57] ABSTRACT

A rolling bearing comprises an outer race member, an inner race member concentrically arranged therewith, rolling elements disposed therebetween, and a shield plate attached to a side end of an inner periphery of the outer race member by being caulked or latched. The shield plate is provided with a curled portion which curls outwardly in the axial direction at a stepped portion of a groove formed at a side end of the outer race member, and the shield plate is formed with slits extended toward an outer periphery of the shield plate from portions which are not located at and over the bottom of the curled portion, the number of the slits being more than $(nZ \pm X)$ inclusive of $(nZ \pm X)$, where n is a positive integer, Z is the number of balls and X is an integer more than 1.

1 Claim, 2 Drawing Sheets

ROLLING BEARING WITH A SHIELD PLATE

This application claims the benefit of the Japanese Application No. 9-233259 which is hereby incorporated by reference.

BACKGROUND OF the INVENTION

1. Field of the Invention

The present invention relates to a rolling bearing for supporting a rotary portion such as a hard disk drive (HDD) device for a computer or the like.

2. Related Background Art

Conventionally, to a rolling bearing used for a spindle device of a hard disk drive unit or the like, a caulked type or latched type shield plate has been attached.

When a conventional caulked type shield plate with no slit or cut-away portion is assembled to a rolling bearing by being caulked, there is a case where the shield plate is not held or supported with a stability because of deformation of a groove of an outer race member caused by thermal processing, or the like.

When the shield plate is caulked into the groove of the outer race, stress is apt to be concentrated onto a smaller diameter portion of the deformed portion at the groove of the outer race member deformed due to thermal processing. That deformation is apt to affect on an outer diameter portion of the outer race member, thereby causing deteriorated roundness or circularity.

Till now, no consideration has been paid to the number of the slit or cut-away portions even in the case where the shield plate formed with slits has been used.

The inventors have found that a rolling bearing with a shield plate formed with nZ or (nZ±1) slit or cut-away portions (that is, the number of slit or cut-away portions of the shield plate is nZ or (nZ±1), where n is a positive integer, and Z is the number of balls,) has a problem that vibration non-synchronous with rotation of the rolling bearing, that is, non-repetitive runout of the rolling bearing increases.

Such shield plate is attached, by being caulked, to a stepped portion of the groove formed on the outer race of the bearing. However, if the slit or cut-away portion(s) is (are) formed at the position of a curled bottom portion of the shield plate, the shield plate can not continue the tight contact relationship with the stepped portion of the groove of the outer race member, and this has caused a problem that grease in the bearing leaks out during the working time of the bearing.

Moreover, the conventional shield plate has another problem that, in the case where an angle is provided at the stepped portion of the groove of the outer race member, grease would leak out in the similar manner as last discussed herein above.

SUMMARY OF THE INVENTION

The present invention has for its object to provide an improved rolling bearing with a shield plate formed with slit or cut-away portion(s), which has no drawbacks or problems peculiar to the prior art rolling bearings as above-mentioned.

The present invention for attaining the above object, provides a rolling bearing comprising an outer race member, an inner race member concentrically arranged therewith, rolling elements disposed between the outer race member and the inner race member, and a shield plate attached to a side end of an inner periphery of the outer race member by being caulked or latched, being characterized in that the shield plate is provided with a curled portion which curls outwardly in the axial direction at a stepped portion formed at a side end of the outer race member, and the shield plate is formed with slits extended toward an outer periphery of the shield plate from portions which are not located at and are over the bottom of the curled portion, the number of the slits being more than (nZ±X) and inclusive of (nZ±X), where n is a positive integer, Z is the number of balls and X is an integer more than 1.

DESCRIPTION OF THE PREFERRED EMBODIMENTS

Preferred embodiments of the present invention will be described below in detail with reference to the accompanying drawings.

Figure 1A:
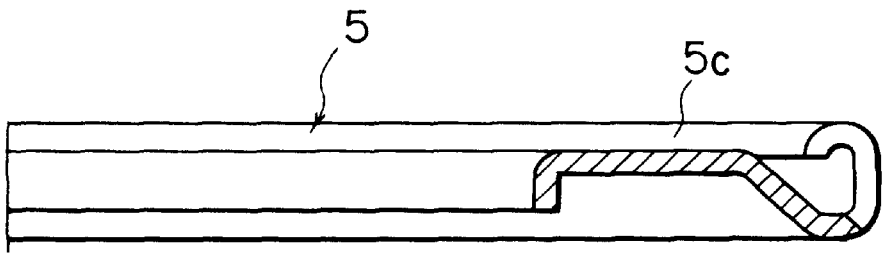
FIG. 1A is a cross-sectional view of a portion of a shield plate to be assembled, by being caulked, into an outer race member of a bearing assembly as a first embodiment of the present invention.
Figure 1B:
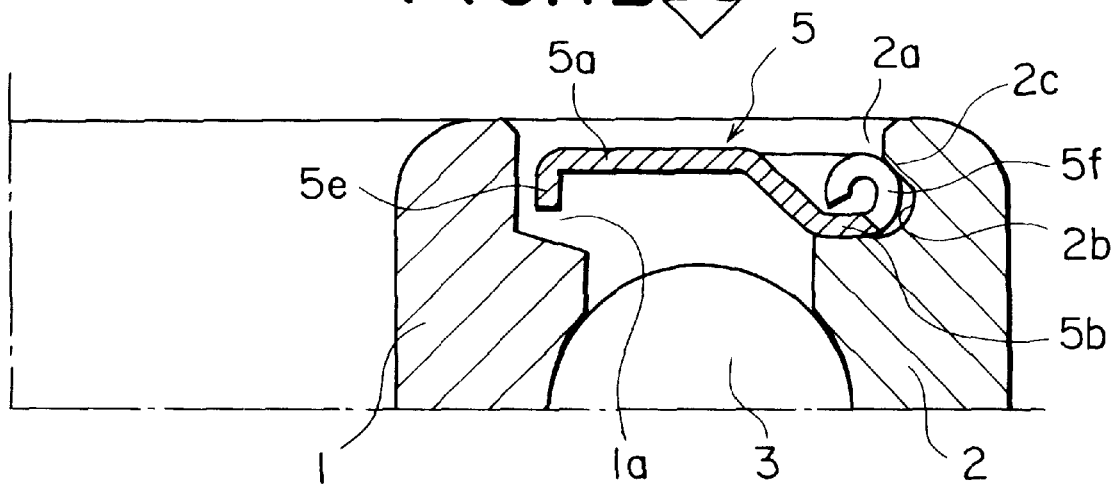
FIG. 1B is a cross-sectional view of a portion of the bearing assembly as the first embodiment of the present invention.

FIGS. 1A and 1B are cross-sectional views for explaining a rolling bearing to be used for a hard disk drive. The rolling bearing comprises an inner race member 1, an outer race member 2 concentrically arranged therewith and a number of balls disposed between the inner race member 1 and the outer race members 2.

An annular groove having a stepped portion 2a is formed at an inner peripheral side of a side end of the outer race member 2. The stepped portion 2a is extended from a radially extended bottom flat portion through a radially deepest portion 2b to an angled shoulder portion 2c projected radially inwardly.

An outer periphery at a side end of the inner race member 1 is formed with a stepped portion 1a with opposed to the stepped portion 2a of the outer race member 2.

The shield plate 5 is annular and has a flat portion 5a opposed to balls 3 at a bearing space formed between the inner race member and the outer race member. The shield plate 5 is extended radially outwardly with inclined axially inwardly from the flat portion 5a and is provided with a bottom portion 5b which is in pressure contact with the bottom flat portion of the stepped portion 2a of the outer race member 2. Further, the shield plate 5 is formed with a curled portion 5c which is curved outwardly in the axial direction from the bottom portion 5b. The curled portion 5c has a natural shape as shown in FIG. 1A prior to being assembled, and after assembled, the shield plate 5 is fixed to the outer race member by the curled portion 5c being caulked or latched into between the bottom flat portion and the shoulder portion 2c of the stepped portion 2a, as shown in FIG. 1B.

An inner-diametral end of the flat portion 5a of the shield plate 5 is formed with an axially inwardly bent portion 5e extended toward into the stepped portion 1a of the outer race member 1.

Figure 2:
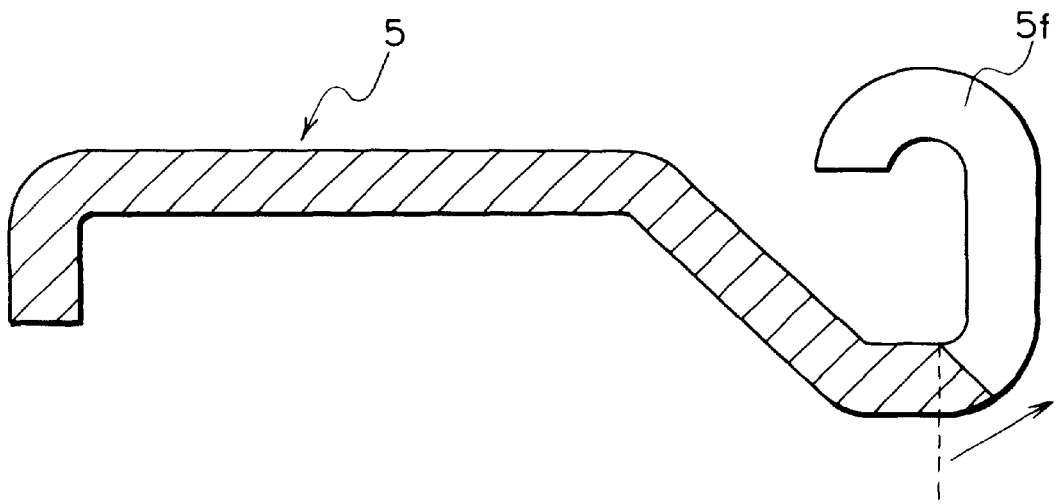
FIG. 2 is a partial enlarged cross-sectional view of the shield plate.

The shield plate 5 is formed with slits or cut-away portions 5f each extended through the curled portion outwardly from a radially outer position over the bottom portion 5b. Each slit 5f is not located at the bottom portion 5b but has an inner end outside of the bottom portion 5b. The inner end of the bottom portion 5b is inclined from a radially outer end of the flat bottom portion 5b in the curled portion, with respect to a dotted line, as shown in FIG. 2.

The slits 5f are formed equi-intervally on the annular shield plate, that is, the slits 5f are disposed equi-angularly, and the number of the slits is nZ±2, where n is a positive integer, and Z is the number of balls in the bearing.

By providing slits on the shield plate, even in the case where the shield plate, upon assembling into the groove of the outer race member by being caulked or latched, may fit the deformed groove (deformed due to thermal processing) of the outer race member and does not cause any deformation of the outer diameter portion of the outer race member after assembling the shield plate into the groove of the outer race member. This is because, in the case where the caulking type shield plate in which a plurality of slits are formed on the shield plate uniformly along an outer periphery, is adopted, even if there exists an elliptical deformation of the groove in the outer race member, each curled portion extended between the neighboring slits may be spreaded out in the radial direction with respect to the larger diameter portion of the elliptical groove deformation of the outer race member.

With respect to the smaller diameter of the elliptical groove deformation of the outer race member, the corresponding curled portion between the neighboring slits is spread out. However this spreading-out is smaller than that with respect to the larger diameter of the elliptical deformation, and thereafter the curled portion is pressed in the axial direction into the groove of the outer race member.

By the provision of a plurality of slits on the shield plate, a plurality of independent or separate curled portions are formed around the shield plate. When assembling such shield plate by caulking, each independent curled portion may be caulked with following deformation of the groove of the outer race member. Accordingly, it is possible to reduce deformation of the outer diameter portion of the outer race member after assembling the shield plate by caulking.

The curled portions between slits formed on the shield plate which is attached to the outer race member by being latched, are spread or enlarged in the radial direction with respect to the larger diameter portion of the deformed groove in the outer race member and elastically deformed with holding elasticity in the axial direction with respect to the smaller diameter portion of the same groove. Thereby, the shield plate may be attached to the groove of the outer race member with following the deformation of the groove of the outer race member in the same manner as that of the caulking type shield plate, and it may become possible to reduce the deformation of the outer diameter portion of the outer race member after the shield being assembled thereto.

According to the present invention, the number of the slits provided on the shield plate is more than (nZ±2) inclusive of (nZ±2), where n is a positive integer, and Z is the number of balls, whereby in the case where the bearing provided with the shield plate is rotated, non repetitive runout of the inner race member and the outer race member in the radial as well as axial directions may be reduced.

However, in the case where the number of the slits formed on the shield plate is nZ, there would be cases where the outer race member is deformed by being affected by the deformation of the groove of the outer race member. In such cases, not only the outer diameter portions of the outer race member but also the ball rolling surface of the outer race member is affected by that deformation of the groove, thereby peaks (or valleys) which amount to nZ in number, being formed relative to Z balls. Thus, in the case where Z balls pass the ball rolling surface or raceway deformed to have nZ peaks (valleys) located relative to Z balls, the inner race member or outer race member at the non fixed side generates non repetitive runout in the axial direction.

In the case where the shield plate formed with (nZ±1) slits are assembled to the groove of the outer race member, the ball rolling groove is deformed to have (nZ±1) peaks (or valleys) in the same manner as discussed hereinbefore, whereby in the case where Z balls pass the deformed ball rolling surface the non fixed side inner race member or outer race member generate non repetitive runout in the radial direction. By the provision of the slits more than (nZ±2) in number inclusive of (nZ±2), it is possible to reduce non repetitive runout of the inner race member or outer race member at the non stationary side.

According to the present invention, the slits are provided at the portions where the bottom of the curled portion of the shield plate is not located, whereby the shield plate and the stepped portion at the groove of the outer race member may be brought into improved tight contact so that it is possible to prevent grease from leaking from the inside of the bearing. On the contrary, in the case where the slits are formed to and through the bottom of the curled portion, space or clearance is formed between the stepped portion of the groove of the shield plate and the slits thereof, through which space or clearance grease leaks from the inside of the bearing.

Figure 3:
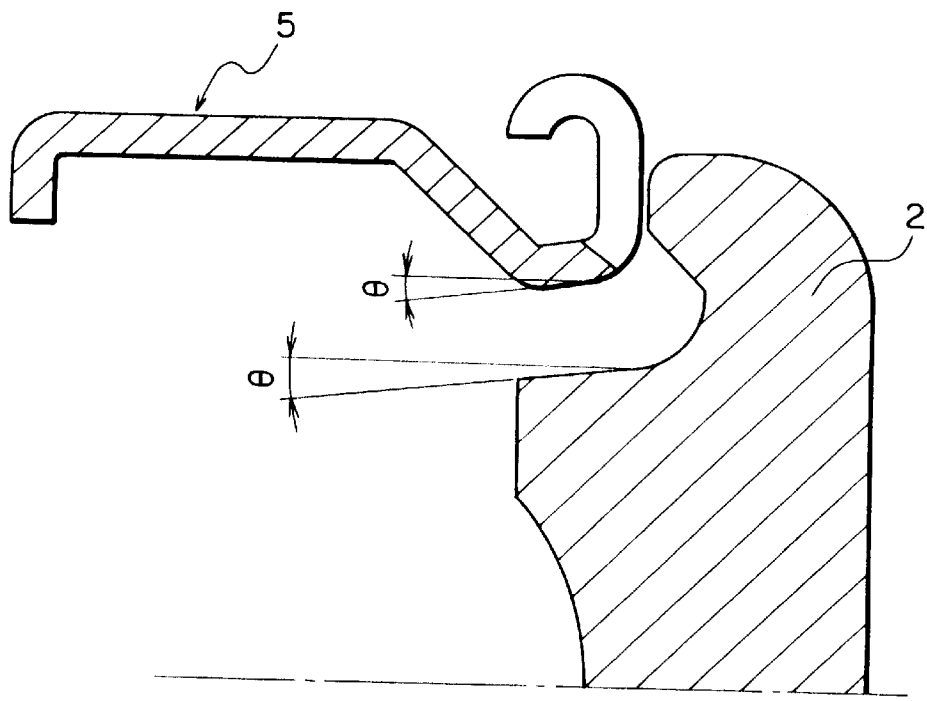
FIG. 3 is a cross-sectional explanatory view of the relationship between the shield plate and a stepped portion of a groove formed at the outer race member.

Further, if an angle which is the same angle as that subtended by the stepped portion of the outer race member, is provided at the bottom portion of the curled portion of the shield plate, as shown in FIG. 3, the bottom of the curled portion of the shield plate may be brought into improved tight contact with the stepped portion of the groove of the outer race member, thereby it being possible to prevent leakage of grease from the inside of the bearing.

On the contrary, in the case where the bottom of the curled portion of the shield plate has no angle or a smaller angle than the angle subtended by the stepped portion of the groove of the outer race member, any space or clearance is produced between the bottom of the curled portion of the shield plate and the stepped portion of the groove of the outer race member, after assembling, by which grease is apt to be leak from the inside of the bearing.

Figure 4A:
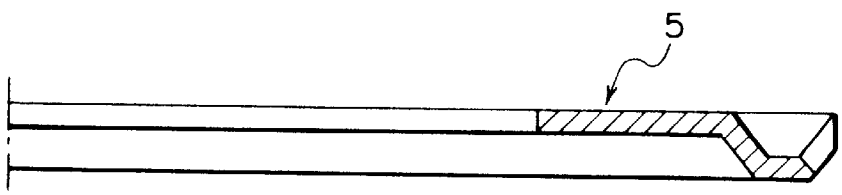
FIGS. 4A and 4B are explanatory views of a rolling bearing with a latched shield plated as a second embodiment of the present invention, FIG. 4A being a cross-sectional view of a portion of a shield plate prior to being assembled, by being latched, to an outer race member of the second embodiment, and FIG. 4B being a cross-sectional view of a portion of the bearing assembly as the second embodiment of the present invention.
Figure 4B:
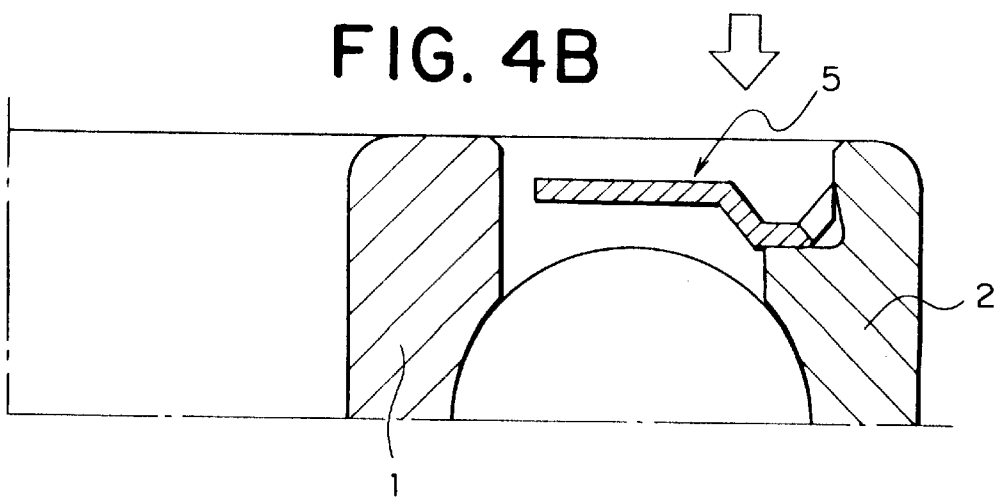

In addition, FIG. 4 shows another embodiment of the invention in which the present invention is applied to a case where the shield plate is assembled with the outer race member by being latched therewith. The structure as well as the operational effect of this embodiment is similar to the case where the shield plate is caulked to the outer race of the bearing.

What is claimed is:

1. A rolling bearing comprising an outer race member, an inner race member concentrically arranged therewith, rolling elements disposed therebetween, and a shield plate attached to a side end of an inner periphery of the outer race member by being caulked or latched, being characterized in that the shield plate is provided with a curled portion which curls outwardly in the axial direction at a stepped portion of a groove formed at a side end of the outer race member, and the shield plate is formed with slits extended toward an outer periphery of the shield plate from portions which are not located at and over the bottom of the curled portion, the number of the slits being more than $(nZ\pm X)$ inclusive of $(nZ\pm X)$, where n is a positive integer, Z is the number of balls and X is an integer more than 1.

* * * * *